United States Patent
Hopf et al.

(10) Patent No.: US 6,603,728 B1
(45) Date of Patent: Aug. 5, 2003

(54) LIQUID-FILLED DAMPER FOR A SHOCK-SENSITIVE APPARATUS, AND METHOD OF MANUFACTURING SAID DAMPER

(75) Inventors: Christian Hopf, Wetzlar (DE); Norbert Kunze, Diez (DE); Stefan Müller, Wetzlar (DE); Horst Rumpf, Herborn (DE); Cornelius Wouters, Kuringen (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/377,360

(22) Filed: Aug. 19, 1999

(30) Foreign Application Priority Data

Aug. 26, 1998 (DE) .......................... 198 38 753

(51) Int. Cl.⁷ .......................... G11B 23/00; G11B 25/04
(52) U.S. Cl. .......................... 369/263
(58) Field of Search .......................... 369/263, 258, 369/176, 248, 247; 360/97.02, 97.01, 88; 361/685; 248/636, 562, 638

(56) References Cited

U.S. PATENT DOCUMENTS

| | | | | |
|---|---|---|---|---|
| 4,679,759 A | * | 7/1987 | Ford | 267/140.13 |
| 4,922,478 A | * | 5/1990 | Verhagen | 369/247 |
| 4,985,884 A | * | 1/1991 | Watanabe et al. | 369/263 |
| 6,392,982 B1 | * | 5/2002 | Kobayashi et al. | 369/263 |
| 6,439,551 B1 | * | 8/2002 | Kato | 267/113 |

FOREIGN PATENT DOCUMENTS

| JP | 07071507 A | 3/1995 |
|---|---|---|
| JP | 62124332 A | 6/1997 |

* cited by examiner

Primary Examiner—Brian E. Miller
Assistant Examiner—Julie Anne Watko
(74) Attorney, Agent, or Firm—Laurie E. Gathman

(57) ABSTRACT

The invention relates to a liquid-filled damper for a shock-sensitive apparatus, comprising a base part and an elastic cover part. It is an object of the invention to provide a liquid-filled damper and a method of manufacturing such a damper, which can be manufactured and mounted in an easier and more reliable way. To this end, the liquid-filled damper comprises an integrated fixation element, and the base part and the integrated fixation element are connected by means of the elastic cover part.

20 Claims, 1 Drawing Sheet

Figure 1:
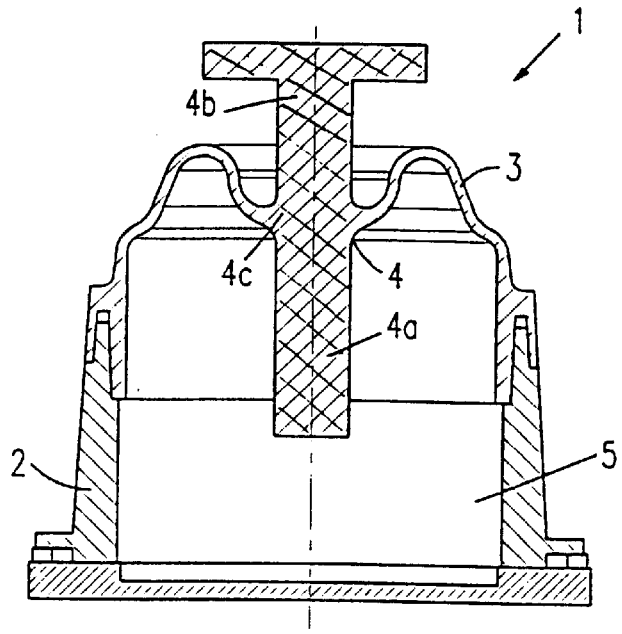

LIQUID-FILLED DAMPER FOR A SHOCK-SENSITIVE APPARATUS, AND METHOD OF MANUFACTURING SAID DAMPER

The invention relates to a liquid-filled damper for a shock-sensitive apparatus, comprising a base part and an elastic cover part.

Such a damper is known from JP-A-07 071 507. The cover part of this known damper has an elastic indentation provided for accommodating a locking pin. In a shock-sensitive apparatus, the base part of the liquid-filled damper is fixed either to the housing or to a shock-sensitive unit of the apparatus. In a corresponding manner, either the shock-sensitive unit or the housing has one or more locking pins engaging the indentation of the elastic cover part of the damper. The shock-sensitive unit is thereby suspended elastically and damped in the housing of the shock-sensitive apparatus. This known construction has the drawback that the locking pin and the damper must be first mounted separately and that only subsequently the locking pin is forced into engagement with the indentation in the cover part.

It is an object of the invention to provide a liquid-filled damper and a method of manufacturing such a damper, which can be manufactured and mounted in an easier and more reliable way.

According to the invention, this object is achieved for the damper in that the liquid-filled damper comprises an integrated fixation element, and in that the base part and the integrated fixation element are connected by means of the elastic cover part.

The fixation element is thus an integral part of the liquid-filled damper. The elastic cover part is connected to the integrated fixation element and to the base part. Preferably, the integrated fixation element is arranged in the center of the elastic cover part, and is surrounded by the elastic cover part. The fixation element is thus elastically connected in a damped manner to the base part.

In one advantageous implementation of the invention, the integrated fixation element may be implemented, for example, as a snap, click or locking element. The base part and the integrated fixation element are preferably made of the same synthetic material. However, different, substantially non-elastic synthetic materials are also possible for the base part and the integrated fixation element. Such a damper can be made easily at low cost, preferably by means of multi-component molding.

In one advantageous implementation of the invention, the integrated fixation element may be implemented, for example, as a bush which, for fixation to a counter piece, can be pulled through a hole in the counter piece and is thus automatically clamped in place. The cover part and the integrated fixation element in this embodiment are preferably made of the same material, particularly rubber.

In accordance with a preferred embodiment of the invention, the fixation element is implemented as a fixation pin. Such a fixation pin is very favorable from a manufacturing-technical point of view and can be fixedly connected in a simple way to elements of the shock-sensitive apparatus, for example, by pressing into a fixation hole of the shock-sensitive apparatus. Moreover, such a connection is very reliable. In one advantageous implementation of the invention, the fixation pin extends beyond the elastic cover part. This part of the fixation pin extending beyond the elastic cover part may be fixed, for example, in a fixation hole of the shock-sensitive apparatus. On the other hand, the fixation pin also extends into the inner, liquid-filled part of the damper. The movement of the fixation pin is thereby damped by the liquid within the damper.

One advantageous implementation of the invention has the advantage that particularly satisfactory damping properties can be achieved with this implementation.

According to the invention, the object of the invention is solved for an electronic apparatus in that the damper comprises an integrated fixation element, in that the base part and the integrated fixation element are connected by means of the elastic cover part, in that either the integrated fixation element is fixed to the housing and the base part is fixed to the shock-sensitive unit, or in that the integrated fixation element is fixed to the shock-sensitive unit and the base part is fixed to the housing.

In such an electronic apparatus, the damper and the shock-sensitive unit can be mounted in a simple manner. No separate mounting of the fixation elements and the damper is required.

Particularly apparatuses for reading or writing information on an optical record carrier are suitable as electronic apparatuses because the optical read and/or write units of such apparatuses must be very satisfactorily damped against vibrations from the outside for operation without disturbance. Particularly strict requirements are imposed on apparatuses which are adapted to be built into vehicles because such apparatuses are subject to multiple vibrations during the drive.

For the method according to the invention, the object is solved by the steps of
- molding a base part and a fixation element from a substantially non-elastic synthetic material, and
- molding a cover part from an elastic synthetic material, the base part and the fixation element being connected together by means of the elastic cover part.

This method is a multi-component molding method. In a first step, the base part and the fixation element, for example, the fixation pin, are molded from a synthetic material. These two synthetic material molded parts are then fixed in the desired position and, in a subsequent step, the cover part made of an elastic material, preferably an elastic synthetic material, is molded onto the base part at one end and to the fixation element at the other end. Such a method is very simple and inexpensive because the complete damper can be manufactured from one piece, and no separate manufacture and mounting of the fixation elements is necessary.

These and other aspects of the invention are apparent from and will be elucidated with reference to the embodiments described hereinafter.

Figure 2:
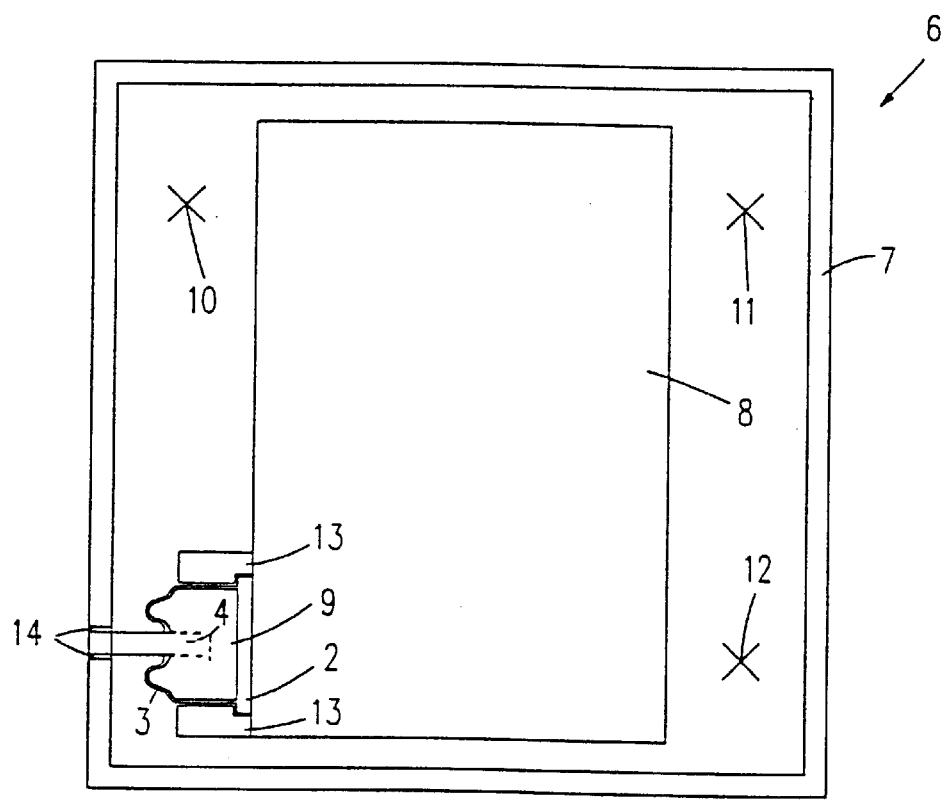

In the drawings:

FIG. 1 is a cross-sectional view of a liquid-filled damper with an integrated fixation pin, FIG. 2 is a plan view of an electronic apparatus with a shock-sensitive unit arranged in a housing, which unit is coupled to the housing by means of four liquid-filled dampers.

FIG. 1 shows a liquid-filled damper 1 in a cross-sectional view, comprising a cylindrical base part 2, an elastic cover part 3 shutting off the cylindrical base part 2, and a fixation pin 4 as a fixation element. The base part 2 and the cover part 3 surround a cavity 5 which is filled with oil. The fixation pin 4 is arranged centrally within the cover part 3 and extends with an inner part 4*a* into the cavity 5 and with an outer part 4*b* beyond the cavity 5 and the cover part 3. The fixation pin 4 is connected to the elastic cover part 3 in an axial central area 4*c*. The elastic cover part 3 annularly surrounds the cylindrical fixation pin 4 in the axial central area 4*c*. The base part 2 and the fixation pin 4 are preferably made of a rigid, non-elastic synthetic material. The elastic cover part 3 is preferably made of an elastic synthetic material. The liquid-filled damper 1 is preferably manufactured by means of a multi-component molding method. In a first step, the base part 2 and the cylindrical fixation pin 4 are molded from a synthetic material. Subsequently, a viscous material such as oil is introduced into the base part 2. Then, the base part 2 and the fixation pin 4 are arranged in the desired position with respect to each other and, in a subsequent molding process, the cover part 3 is formed on the fixation pin 4 and on the base part 2 so that the base part 2 and the integrated fixation pin 4 are connected by means of the cover part 3 and the closed cavity 5 is thereby formed. The fixation pin 4 is thus elastically journaled with respect to the base part 2. When the fixation pin 4 moves with respect to the base part 2, the inner part 4a of the fixation pin 4 is moved in the oil in the cavity 5 so that the movement of the fixation pin 4 is damped. The fixation pin 4 is intended to be connected either to a shock-sensitive unit of a shock-sensitive apparatus, or to a housing element of the shock-sensitive apparatus. Accordingly, the base part 2 is either fixed to the housing element of the shock-sensitive apparatus or to the shock-sensitive unit. This will be further described with reference to FIG. 2.

FIG. 2 shows an electronic apparatus 6 which is provided for reading information stored on an optical record carrier and/or for writing information on an optical record carrier, particularly a CD/DVD player.

The electronic apparatus 6 has a housing wall 7. An optical playback unit 8 is arranged within the housing wall 7. The optical playback unit 8 is coupled to the housing wall 7 by means of four liquid-filled dampers 9, 10, 11 and 12 having a similar construction. The liquid-filled dampers 9 to 12 are implemented in the same way as the liquid-filled damper 1 shown in FIG. 1. Consequently, the same reference numerals as for the liquid-filled damper 1 of FIG. 1 are used for identical elements of the liquid-filled dampers 9 to 12. The liquid-filled dampers 9 to 12 thus each have a base part 2, a cover part 3 and a fixation pin 4. A cavity 5 filled with oil is present within each liquid-filled damper 9 to 12. The optical playback unit 8 comprises a locking device 13 for each liquid-filled damper 9 to 12, which locking device is fixedly connected to the optical playback unit 8. The locking devices 13 are shown diagrammatically and may be implemented, for example, as synthetic material molded elements.

The base parts 2 of the liquid-filled dampers 9 to 12 are fixed to the locking devices 13. The fixation may be alternatively realized in different manners, for example, by form-locking or clicking. The fixation pins 4 of the liquid-filled dampers 9 to 12 are secured in fixation holes 14 of the housing wall 7. The fixation pins 4 may be secured in the cylindrical fixation holes 14 of the housing wall 7 by means of, for example, pushing or pressing into the fixation holes 14. Moreover, snap or click connections can be realized. The liquid-filled dampers 9 to 12 are thus fixedly connected to the housing wall 7 by means of the fixation pins 4 and the fixation holes 14, and to the optical playback unit 8 by means of the base part 2 and the locking device 13. The electronic apparatus 6 is particularly adapted to be built into a vehicle. The vibrations occurring during the vehicle drive are transmitted to the housing wall 7 of the electronic apparatus 6. Since the optical playback unit 8 is very sensitive to shocks, the vibrations of the vehicle should, however, not be transmitted to the optical playback unit 8. This is ensured by means of the liquid-filled dampers 9 to 12 which journal the optical playback unit 8 in a floating manner within the electronic apparatus 6.

Since the fixation pins 4 are formed in one piece with the base part 2 and the cover part 3, the liquid-filled dampers 9 to 12 can be mounted in a simple manner. No separate mounting of fixation pins and dampers is required. This is advantageous from a manufacturing-technical point of view.

What is claimed is:

1. A liquid-filled damper for a shock-sensitive apparatus, comprising a base part and an elastic cover part, wherein the liquid filled-filled damper comprises an integrated fixation element, and wherein the base part and the integrated fixation element are connected by means of the elastic cover part; and wherein an inner part of the integrated fixation element extends into a cavity of the liquid-filled damper.

2. A liquid-filled damper as claimed in claim 1, wherein the base part and the integrated fixation element are made of a substantially non-elastic synthetic material, and wherein the elastic cover part is made of an elastomer.

3. A liquid-filled damper as claimed in claim 1, wherein the base part is made of a substantially non-elastic synthetic material, and wherein the elastic cover part and the integrated fixation element are made of an elastomer.

4. A liquid-filled damper as claimed in claim 1, wherein the fixation element is implemented as a fixation pin.

5. A liquid-filled damper as claimed in claim 4, wherein the fixation pin is connected to the elastic cover part in an axial central area.

6. A liquid-filled damper as claimed in claim 1, wherein the liquid is a viscous material.

7. An electronic apparatus comprising a shock-sensitive unit accommodated in a housing, which unit is coupled to the housing by means of at least a liquid-filled damper, the damper having a base part and an elastic cover part, wherein the damper comprises an integrated fixation element, wherein the base part and the integrated fixation element are connected by means of the elastic cover part, wherein an inner part of the integrated fixation element extends into a cavity of the liquid-filled damper; and wherein either the integrated fixation element is fixed to the housing and the base part is fixed to the shock-sensitive unit, or wherein the integrated fixation element is fixed to the shock-sensitive unit and the base part is fixed to the housing.

8. An electronic apparatus as claimed in claim 7, wherein the apparatus is an apparatus for reading information stored on an optical record carrier and/or for writing information on an optical record carrier.

9. An electronic apparatus as claimed in claim 7, wherein the apparatus is adapted to be built into a vehicle.

10. An electronic apparatus as claimed in claim 7 wherein the apparatus for reading information stored on an optical record carrier and/or for writing information on an optical record carrier is a CD/DVD apparatus.

11. A liquid-filled damper for a shock-sensitive apparatus, comprising:

a base part and an elastic cover part, wherein the liquid filled-filled damper comprises an integrated fixation element, wherein the base part and the integrated fixation element are connected by means of the elastic cover part, and wherein the base part is made of a substantially non-elastic synthetic material, and wherein the elastic cover part and the integrated fixation element are made of an elastomer.

12. A liquid-filled damper as claimed in claim 11 wherein the elastomer is made of rubber.

13. A liquid-filled damper as claimed in claim 11 wherein the integrated fixation element is implemented as a fixation pin.

14. A liquid-filled damper as claimed in claim 13 wherein the fixation pin is connected to the elastic cover part in an axial central area.

15. A liquid-filled damper as claimed in claim 11 wherein the liquid is a viscous material.

16. A liquid-filled damper as claimed in claim 15 wherein said viscous material is oil.

17. An electronic apparatus comprising a shock-sensitive unit accommodated in a housing, which unit is coupled to the housing by means of at least a liquid-filled damper as claimed in claim 11.

18. An electronic apparatus as claimed in claim 17 wherein the electronic apparatus is an apparatus for reading information stored on an optical record carrier and/or for writing information on an optical record carrier.

19. An electronic apparatus as claimed in claim 18 wherein the apparatus for reading information stored on an optical record carrier and/or for writing information on an optical record carrier is a CD/DVD apparatus.

20. An electronic apparatus as claimed in claim 17 wherein the electronic apparatus is adapted to be built into a vehicle.

\* \* \* \* \*